US010919702B1

(12) United States Patent
Berta

(10) Patent No.: US 10,919,702 B1
(45) Date of Patent: Feb. 16, 2021

(54) AERIAL ROOF HEIGHT ITEM RECEIVING CHUTE

(71) Applicant: Eugene Zoltan Berta, Windsor, CO (US)

(72) Inventor: Eugene Zoltan Berta, Windsor, CO (US)

( * ) Notice: Subject to any disclaimer, the term of this patent is extended or adjusted under 35 U.S.C. 154(b) by 0 days.

(21) Appl. No.: 16/862,476

(22) Filed: Apr. 29, 2020

(51) Int. Cl.
| B65G 17/00 | (2006.01) |
| B65G 11/04 | (2006.01) |
| B65G 11/20 | (2006.01) |
| B65G 11/18 | (2006.01) |
| E01F 3/00 | (2006.01) |
| F16M 11/22 | (2006.01) |

(52) U.S. Cl.
CPC ............ *B65G 11/04* (2013.01); *B65G 11/183* (2013.01); *B65G 11/203* (2013.01); *E01F 3/00* (2013.01); *F16M 11/22* (2013.01); *B65G 2207/28* (2013.01); *F16M 2200/00* (2013.01)

(58) Field of Classification Search
CPC ....... B65G 11/04; B65G 11/20; B65G 11/203; B65G 11/206; B65G 11/183; B65G 2207/28; E04F 15/22; E04F 15/225; E04F 17/00
USPC ...................... 198/534; 193/2 A, 2 D, 32, 34
See application file for complete search history.

(56) References Cited

U.S. PATENT DOCUMENTS

| 1,102,059 A | * | 6/1914 | Smith | ..................... B07B 1/005 209/677 |
| 2,032,258 A | * | 2/1936 | Caton | .................. A01D 46/243 182/49 |
| 3,565,225 A | * | 2/1971 | Fay | ....................... B65G 69/165 193/7 |
| 3,684,072 A | * | 8/1972 | Castrellon | ............ B65G 11/103 193/7 |
| 3,737,165 A | * | 6/1973 | Pencyla | .................... F41J 13/00 273/410 |
| 4,161,243 A | * | 7/1979 | Grisnich | .............. B65G 11/085 193/27 |
| 4,216,853 A | * | 8/1980 | Poff | ..................... B65G 11/206 193/32 |
| 4,332,120 A | * | 6/1982 | Haynes | .................. G21C 21/00 53/245 |
| 4,334,603 A | * | 6/1982 | Carter | .................... B65G 69/16 193/32 |
| 4,363,391 A | * | 12/1982 | Langen | ................ B65G 11/083 193/2 D |
| 4,385,859 A | * | 5/1983 | Goossens | ............. B65G 1/1376 193/32 |

(Continued)

*Primary Examiner* — Joseph A Dillon, Jr.

(57) ABSTRACT

An aerial roof height item receiving structure demonstrating novel solutions to issues of item drop damage, noise, aesthetic, weather, item temperature, and safety concerns related to aerial based item delivery systems is presented. A chimney like chute can be made high enough to avoid collisions with people or pets yet still safely receive items dropped into it from heights through the use of impact absorbing pads and a mesh box spring within the chute. Heat exchange with the building structure or active heating or cooling of the box spring mitigate snow, ice, and item temperature issues. A swing door to function as an aerial unit charging platform for added distance delivery can be added to the top of the chute. An item drop box placed at human accessible height can also be added to allow the chute to dual function for traditional item deliveries.

3 Claims, 5 Drawing Sheets

(56) References Cited

U.S. PATENT DOCUMENTS

| | | | | |
|---|---|---|---|---|
| 4,438,075 A * | 3/1984 | von Branchel | B01D 3/24 | 422/606 |
| 4,476,670 A * | 10/1984 | Ukai | B65G 69/16 | 193/25 R |
| 4,750,602 A * | 6/1988 | Souda | A01D 46/20 | 193/25 C |
| 4,821,861 A * | 4/1989 | Shanahan | B65G 11/083 | 141/310 |
| 4,995,765 A * | 2/1991 | Tokuhiro | B65F 5/005 | 209/580 |
| 5,048,666 A * | 9/1991 | Huggins, Sr. | F27D 3/00 | 198/431 |
| 5,588,285 A * | 12/1996 | Odenthal | B65B 5/101 | 53/171 |
| 5,911,667 A * | 6/1999 | Sanchis | B65G 69/16 | 193/3 |
| 6,059,045 A * | 5/2000 | Rose | A62C 3/04 | 169/48 |
| 6,293,426 B1 * | 9/2001 | Papera | B65G 11/206 | 141/287 |
| 6,315,159 B1 * | 11/2001 | Paczkowski | B65G 11/163 | 193/25 A |
| 6,564,528 B1 * | 5/2003 | Keegan | B65B 5/061 | 198/534 |
| 6,954,947 B1 * | 10/2005 | Williams, Jr. | E04F 17/026 | 4/218 |
| 8,876,439 B2 * | 11/2014 | Sheehan | B01J 8/0015 | 406/168 |
| 9,334,119 B2 * | 5/2016 | Takasugi | B65G 11/088 | |
| 9,975,651 B1 * | 5/2018 | Eck | B64D 1/22 | |
| 10,351,261 B1 * | 7/2019 | Bryant | G07F 9/002 | |
| 2003/0070376 A1 * | 4/2003 | Abraham | F16F 7/00 | 52/480 |
| 2004/0182673 A1 * | 9/2004 | Baller | B65G 11/166 | 193/32 |
| 2006/0113159 A1 * | 6/2006 | Nyquist | E04F 17/12 | 193/33 |
| 2007/0154290 A1 * | 7/2007 | McNaughton | B01J 8/003 | 414/160 |
| 2009/0133985 A1 * | 5/2009 | Preston | E04F 17/12 | 193/34 |
| 2010/0200360 A1 * | 8/2010 | Kang | B65F 5/005 | 193/32 |
| 2012/0240811 A1 * | 9/2012 | Pier | E01B 29/26 | 104/17.1 |
| 2015/0183528 A1 * | 7/2015 | Walsh | A47G 29/14 | 701/3 |
| 2015/0191310 A1 * | 7/2015 | Benjamin | B65G 11/206 | 193/32 |
| 2015/0307280 A1 * | 10/2015 | Brandon | B65G 11/18 | 193/2 A |
| 2016/0101874 A1 * | 4/2016 | McKinnon | A47G 29/14 | 244/114 R |
| 2016/0257423 A1 * | 9/2016 | Martin | B64F 1/00 | |
| 2016/0368721 A1 * | 12/2016 | Haraway | B65G 11/206 | |
| 2017/0001802 A1 * | 1/2017 | Ciliberti, Jr. | C10J 3/26 | |
| 2017/0203857 A1 * | 7/2017 | O'Toole | B64F 1/005 | |
| 2017/0320668 A1 * | 11/2017 | Gill | B65G 11/02 | |
| 2017/0334648 A1 * | 11/2017 | Hartmann | B65G 11/023 | |
| 2018/0202150 A1 * | 7/2018 | Downey | B32B 27/365 | |
| 2018/0220826 A1 * | 8/2018 | Sillings | A47G 29/1225 | |

\* cited by examiner

AERIAL ROOF HEIGHT ITEM RECEIVING CHUTE

CROSS REFERENCE TO RELATED APPLICATIONS

The present applications claims priority to the earlier filed U.S. provisional application having Ser. No. 62/841,274, filed on May 1, 2019, entitled "Aerial roof height item receiving chute", and hereby incorporates subject matter of the provisional application in its entirety.

FIELD OF THE INVENTION

The invention relates generally to the field of item receiving and delivery systems and more specifically relates to aerial item delivery systems where aerial units can stay at roof height levels when releasing an item.

BACKGROUND

Aerial delivery of items is a strong desire for many delivery companies. It is very expensive to hand deliver items especially in rural area. Leaders in the delivery field have shown off custom drones and trucks capable of launching them. But many issues remain on how and where to actually deliver the items themselves. Demos usually show the item being dropped off on the lawn or sometimes the drone operator is daring and gets it onto the porch. For legal and safety concerns it is doubtful such practices can become viable commercial options.

Safety concerns are a big issue since a drone with a package can be over 50 lbs and can cause serious injury in a collision. In a real setting you can't effectively limit kids playing hide and seek in the yard or dogs that don't like drones. One proposed solution is to fence off part of the yard for aerial delivery purposes, but it's a poor use of space and still a risk that any barrier will be overcome especially by kids. It just isn't safe to let a heavy drone get below human height levels in most residential settings.

Some patented solutions (US20150183528A1 and US20160101874A1) focus on window delivery. For cases where an above the first story of a building installation is possible, this solves the drone getting too close to the ground for safety issues. But height issues can still remain as many municipalities are considering restrictions on below roof flying drone usage due to privacy and noise issues. Issues related to current FAA regulations concerning aerial unit line of sight requirements can also present problems for window delivery.

Another solution that has been put into practice is equipping the drone with a rope pulley hoist mechanism to allow it to lower the package from heights. While this is functional it does force the drone to be equipped with the extra equipment and a long strong cord. Releasing the package usually requires either a complex electronically controlled mechanism at the end of the cord or the package needs a substantially large hook attached to it and the drone is carefully maneuvered to release the hook. Any wind in the environment can still cause safety issues as the package and drone can sway unpredictably. This can also make releasing the item from the cord very challenging.

The chimney like chute proposed in the present invention can overcome the issues of height and thereby reduce noise and safety concerns. The aerial unit would release the item above the chute. Chimney like chutes have been proposed before (US20180220826A1) but this invention is unique in that it doesn't require as much space since it is not slide based but item drop based utilizing impact absorbing pads. Slide based solutions also suffer from difficulty in dealing with items getting stuck on the slide. A cheap and easy to implement solution to items getting stuck in the chimney for this pad based solution is presented in this invention.

Many other aerial and drone delivery systems require complex electronics and gear mechanisms to lower and store the items. The present invention presents solutions that would allow functioning without such active control being necessary in most usage settings. They would only be optional to allow delivery during harsh environmental conditions or at such distances that drone charging is required for the return trip.

Other solutions such as the window and fenced off yard solutions mentioned can be considered aesthetic eye sores causing housing associations and local municipalities to consider banning and removal of them. The present invention can have a pretty or building matching facade easily added around it and would be considered by many to just be a chimney stack.

BRIEF SUMMARY OF THE INVENTION

The present invention comprises of a novel aerial roof height item receiving chute presenting solutions to issues of item drop damage, noise, aesthetic, weather, item temperature, and safety concerns related to aerial based item delivery systems. A chimney like chute which can stand alone, be attached to existing building structures, or designed into new building structures can be made high enough to avoid human and pet collision with aerial based item delivery systems such as drones yet still safely receive items dropped into it from the top of the chute. The fall impact of the items are dampened by impact absorbing pads within the chute and a mesh box spring at the bottom of the chute. The aerial delivery unit does not need to approach the ground helping to reduce ground noise. The chute can have a pretty or building matching facade added around it. The chute can be equipped a door opening into the building structure it is attached to for item retrieval. Methods to mitigate rain, snow, ice, and item temperature issues can be provided by allowing the door to crack open letting heat exchange with the building structure or though active heating or cooling of the box spring and/or chute. The top of the chute can be equipped with a swing door to function as an aerial delivery unit charging platform. The chute can also be equipped with an item drop box placed at human accessible height allowing it to be also effective for traditional item deliveries as well.

DETAILED DESCRIPTION OF THE INVENTION

Aerial delivery unit refers to any height based item delivery system such as drones or parachutes.

Item can refer to boxed packages or anything that can withstand small drops. The plural form, items, is assumed in cases where it is an obvious extension to functionality.

Figure 1:
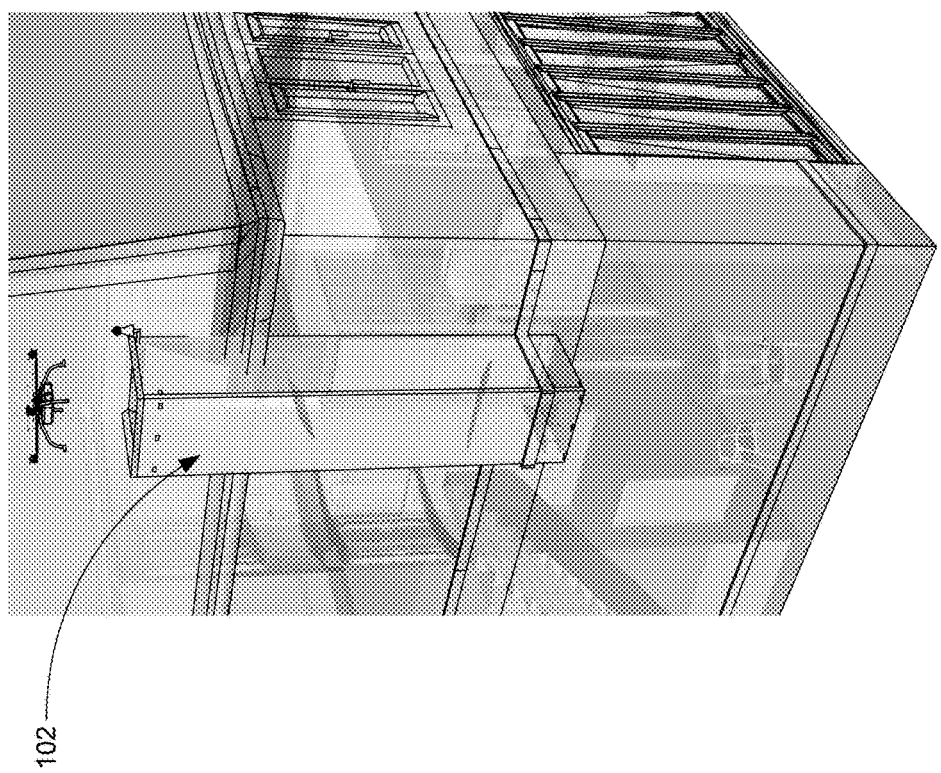
FIG. 1 depicts semi-transparent angled perspective views of an example of chute being attached to an existing building structure at ground level 101 and an example at the second story level 102.
Figure 1:
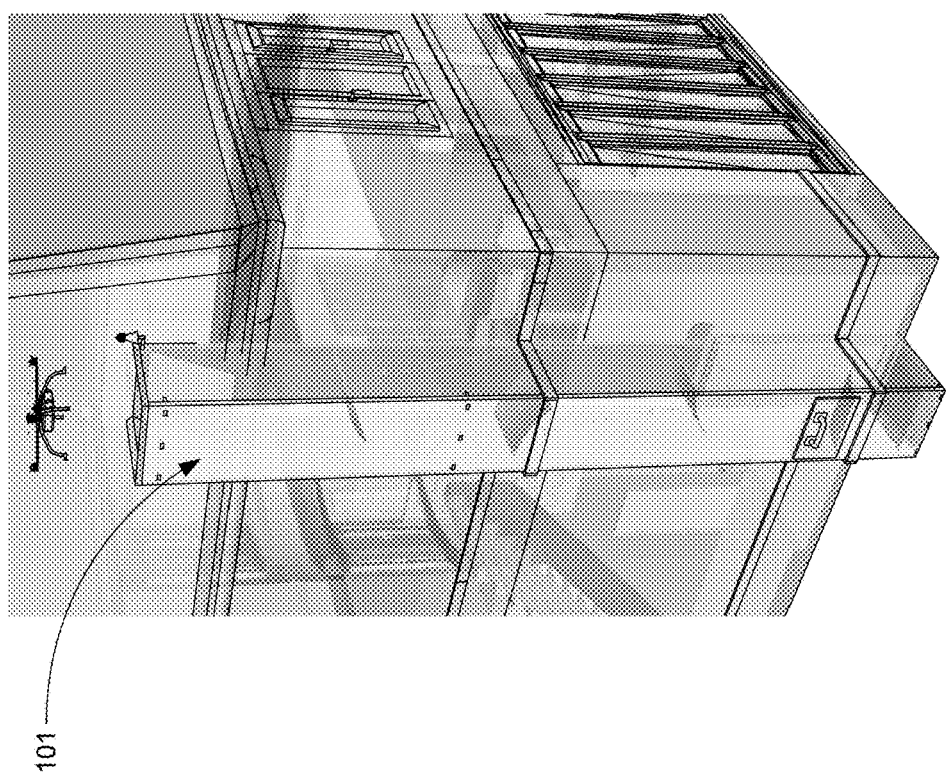
Figure 2:
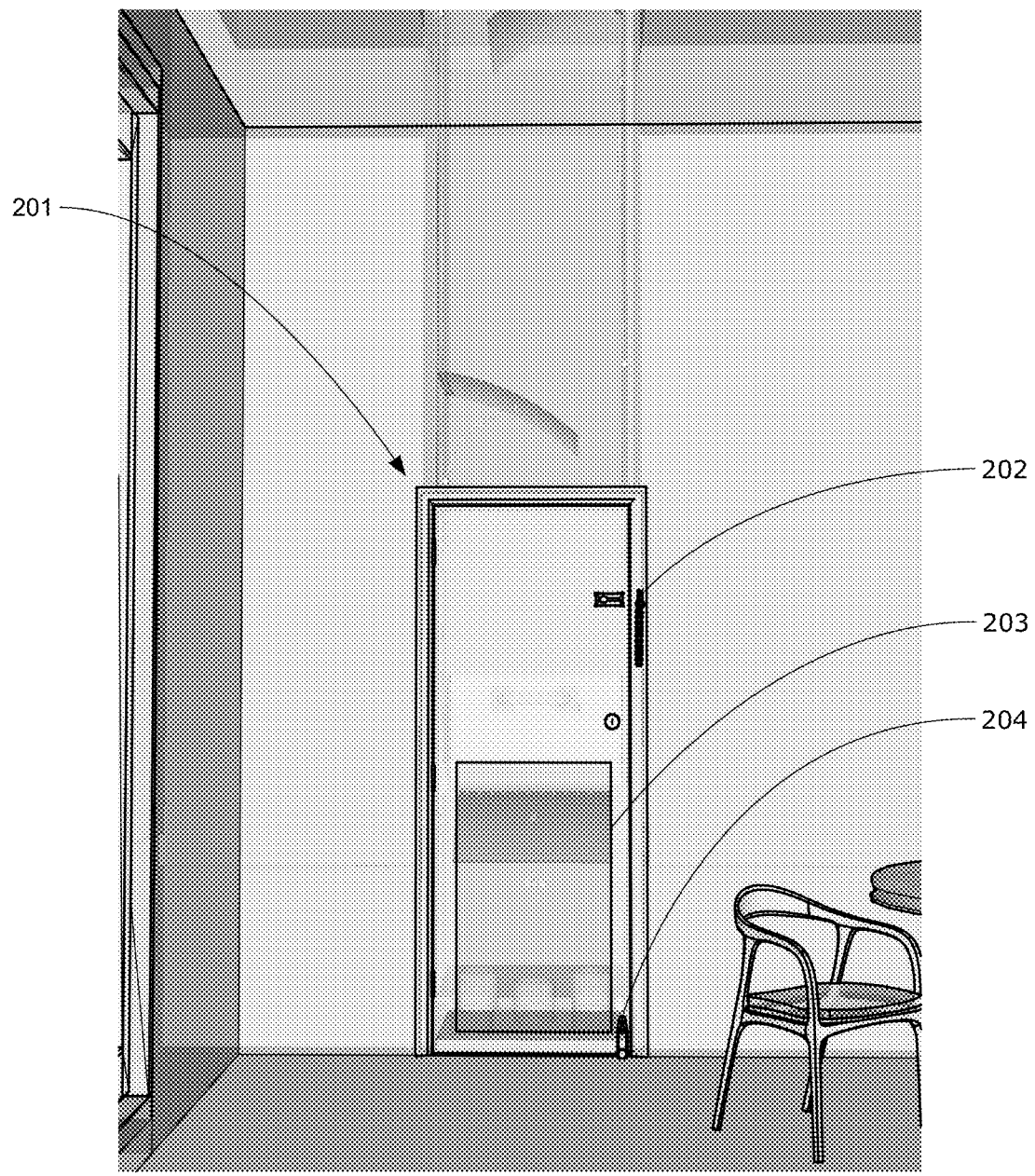
FIG. 2 depicts a semi-transparent front perspective view of one example of chute inside door access 201 to retrieve items from an existing room inside a building structure.

The chute structure can be constructed or placed in various configurations. It can be stand alone, be attached to existing building structures, be installed like a sky roof within building structures, or designed into the blueprints of new building structures. It can extend to any floor level including basement levels. FIG. 1 shows an example of a side installation onto a building 101 and an example of a second story side installation 102. FIG. 2 shows an example of inside door access 201 to the chute structure to retrieve items. The chute wall material can be anything that can withstand environmental conditions it is placed in, can bear the weight of elements placed in it, have an inside surface which would not cause items to get stuck to them, and meets building codes. The inside surface can also be a padded material to further reduce the chances of item damage. Budget installations can use an airy thin material design which does not need strong wind resistance while installations where aesthetics are important can match the material and facade of the building structure.

The chute's height would be determined by safety, noise, and government regulations concerning aerial delivery units. It would be expected to be above human height to reduce chances of collisions resulting in injury. Current USA FAA regulations concerning line of sight for aerial units would also effect chute height and positioning.

Figure 3:
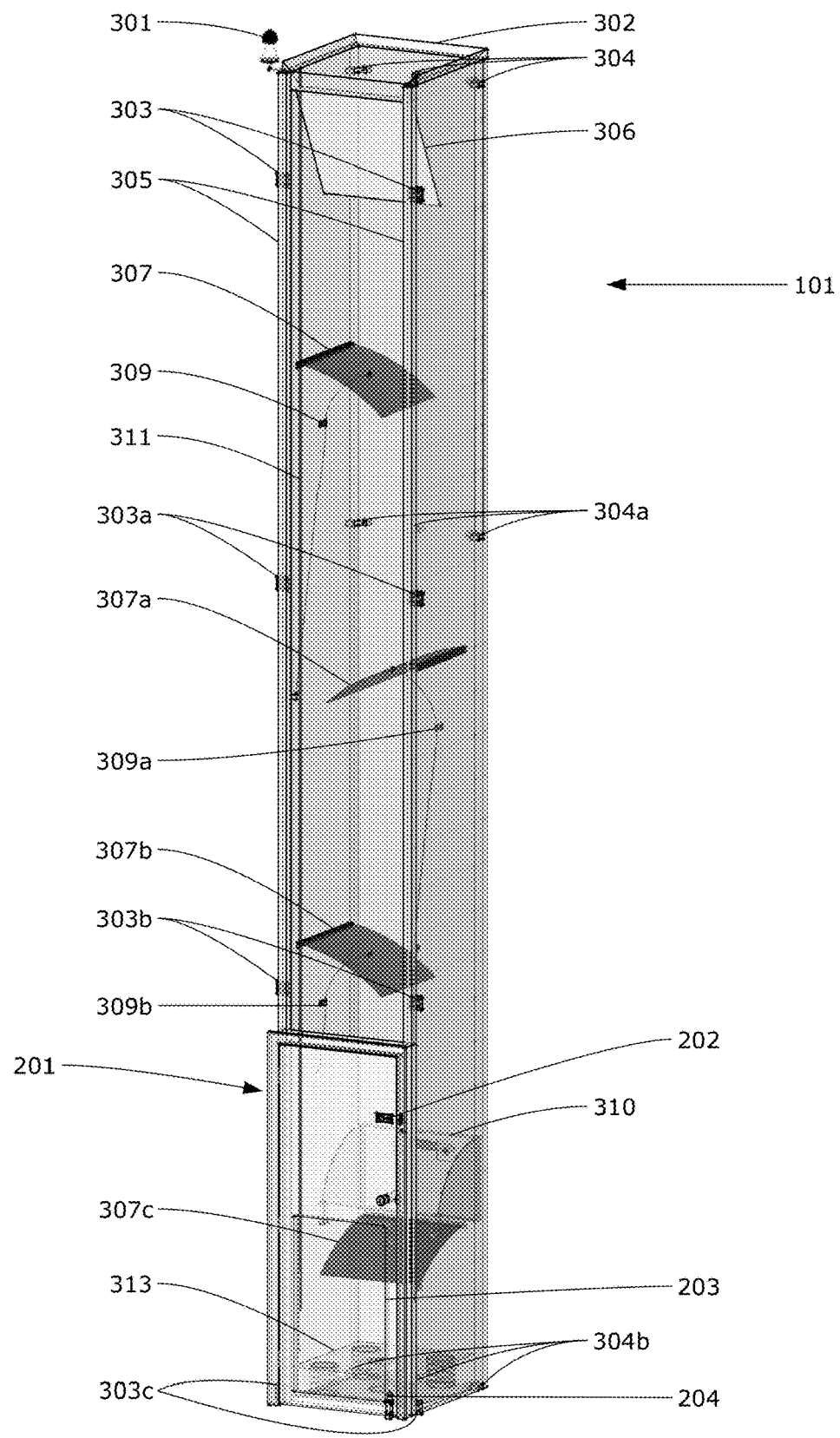
FIG. 3 depicts a semi-transparent near isometric angled parallel perspective view of the chute.

FIG. 3 depicts a semi transparent near isometric angled parallel perspective view of the chute with the angle chosen to better show more of the interior of the chute. Brackets 303,303a,303b,303c can be used to attach the chute to existing building structures. The chute can be equipped with a foam based siding 305 to handle attaching to uneven walls or siding.

The top of the chute can have angled surfaces 302 as a bird nest deterrent.

To handle water runoff, the floor of the chute can be slightly angled with netted mesh drainage holes added 304b to prevent animals from entering but allowing water to flow out. Netted mesh holes in the chute can also be used to provide more air flow 304a to prevent suffocation if a person enters the chute.

The chute can be equipped at the top with a charging platform 306 based on a motor controlled swing door for the aerial unit to rest on while charging. This can handle situations where the aerial unit needs to recharge before making the return trip thereby extending the capable delivery range. The platform can be slightly angled and heated or cooled to deal with snow and ice buildup or temperature requirements of the aerial unit while charging. Netted mesh side drainage holes 304 would allow for rain, snow, and ice runoff while the swing door is closed.

The chute can be equipped with an electrical conduit 311 for powering items such as beacons 301, charging platforms 306, lighting, animal repellents, and heating units.

The chute can be equipped with a human height appropriate drop box 310 to also function for non-aerial deliveries. A pad can be placed right below the drop box 307c to act as a theft deterrent.

The chute can be equipped with a door for item retrieval 201. The door can have a chain or swing bar door guard 202 and a door stopper 204 to allow it to be cracked open and function to provide heat transfer from the structure the chute is attached to if conditions such as a need to melt snow and ice exist or expected items desire a temperature more close to what the chute is attached to. The door can also be equipped with a transparent window 203 to allow a person to see if a item is waiting inside without needing to open the door.

The aerial unit would release items above the chute. To minimize item fall impact damage, impact absorbing pads would be spaced out in the chute 307,307a,307b,307c. The placement would depend on the weight of the expected items dropped in the chute and impact absorbing capabilities of the chosen pads. There are many impact absorbing materials on the market; from relatively cheap urethane rubber to proprietary materials. A 1 ft cubed 50 lb item dropped from a height of 5 ft would have a kinetic energy of 250 ft*lbs when reaching a pad. A pad with a 1 in deflection capability would reduce the impact force to 2996 lbf. Exact needs would depend on dimensions, weight, and protection the item itself has from impact damage.

Figure 4:
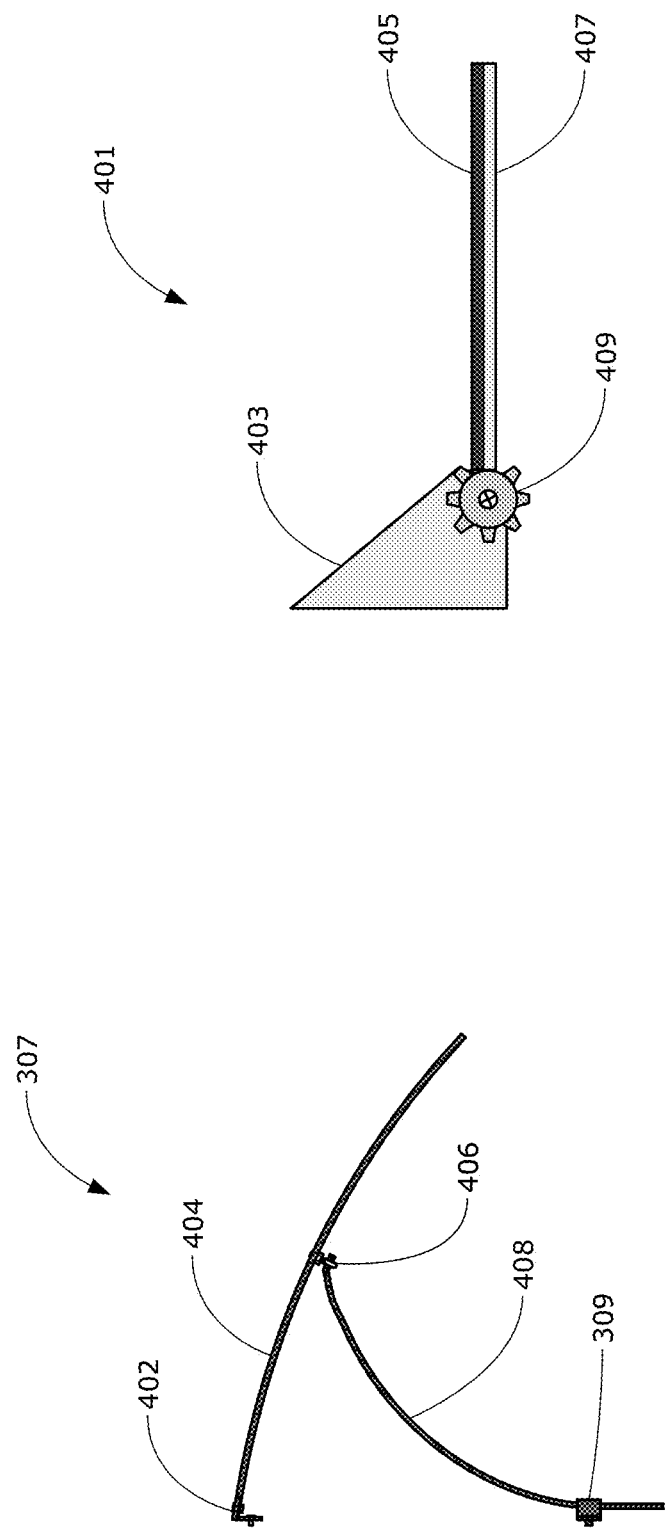
FIG. 4 depicts a side view of one example of a flexible version 307 of impact absorbing pads in the chute and a side view of one example of a rotating swing door version 401 of impact absorbing pads in the chute.

Various configurations for the impact absorbing pads (FIG. 4) are possible. Ideally after dampening the fall velocity of the item, the pad would allow the item to keep falling either to a lower pad or mesh box spring 313 at the bottom of the chute. To reduce stuck items on them, they can be flexible, slopped, made of slippery material, use roller balls or beams, and/or lubricated with friction reducing materials.

For flexible pads 404, a rope system 406,408,309 can be attached to them to allow the user to jiggle them to free stuck items. The rope can be bolted 406 to the bottom of the pad and the rope strung to the side of the chute using brackets 309,309a,309b. This way the rope would be strung to the bottom of the chute for easy user access. The impact absorbing pad 307 can be attached to the chute walls using a bolted side mount 402.

For uses where there is a desire or need to fully absorb the impact force per drop a firm pad configuration 401 can be used. A pad 405 resting on a firm material like a metal plate 407 can be used. The pad can then rotate down like a swing door either through a motor 403 or user controlled gear mechanism 409 letting the item further drop. It can use either impact sensing, optical sensing, weight sensing, or user control to know when an item is on it and lower the plate for further dropping through the chute.

Figure 5:
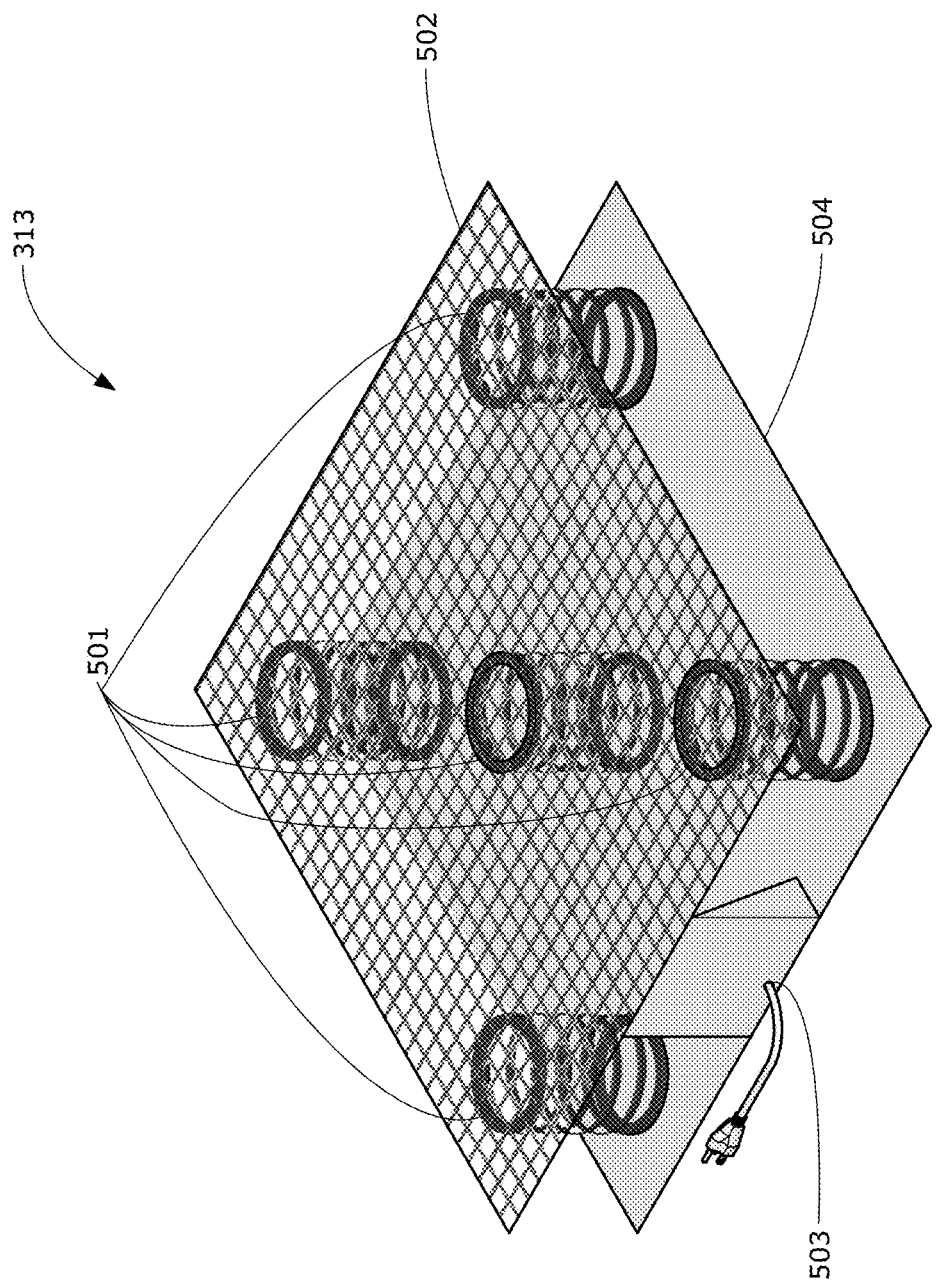
FIG. 5 depicts an isometric view of one example of a netted mesh box spring where items can rest on prior to retrieval from the chute.

A netted mesh box spring 313 (FIGS. 3 and 5) to allow for rain drainage and further impact absorption capabilities can be put at the bottom of the chute. The box would be comprised of a netted mesh top 502 resting on compression springs 501.

The netted mesh box spring can be equipped with or attached to a heater and/or cooler unit 503 to allow for preventing snow/ice buildup or if expected items desire a temperature range while waiting to be retrieved. The netting 502, springs 501, and an added bottom layer 504 can be made with a good thermal conductor like metal to facilitate this function.

What is claimed is:

1. A chute comprising of:

impact absorbing pads spaced to prevent large unimpeded falls;

wherein impact absorbing pads allow for an item to be further dropped from said pads either onto another pad or bottom of the chute wherein said impact absorbing pads have mechanisms on them to assist them to flex or rotate to release an item on them;

wherein the mechanism is a simple rope system mechanism is attached to the impact absorbing pad allowing the impact absorbing pad to be tugged down if items get stuck on the pad.

2. A chute comprising of:

impact absorbing pads spaced to prevent large unimpeded falls;

wherein impact absorbing pads allow for an item to be further dropped from said pads either onto another pad or bottom of the chute;

wherein floor of chute is slightly angled and further comprised of netted mesh drainage holes to allow for rain, snow, and ice runoff but keep animals out.

3. A chute comprising of:

impact absorbing pads spaced to prevent large unimpeded falls;

wherein impact absorbing pads allow for an item to be further dropped from said pads either onto another pad or bottom of the chute;

wherein bottom of chute comprises of a door for item retrieval with a crack open latch to allow for heat transfer from the structure the chute is attached to if conditions such as a need to melt snow and ice exist or expected items desire a temperature more close to what the chute is attached to.

* * * * *